Dec. 25, 1962  E. P. WIGNER  3,070,529
NEUTRONIC REACTOR
Filed March 1, 1946
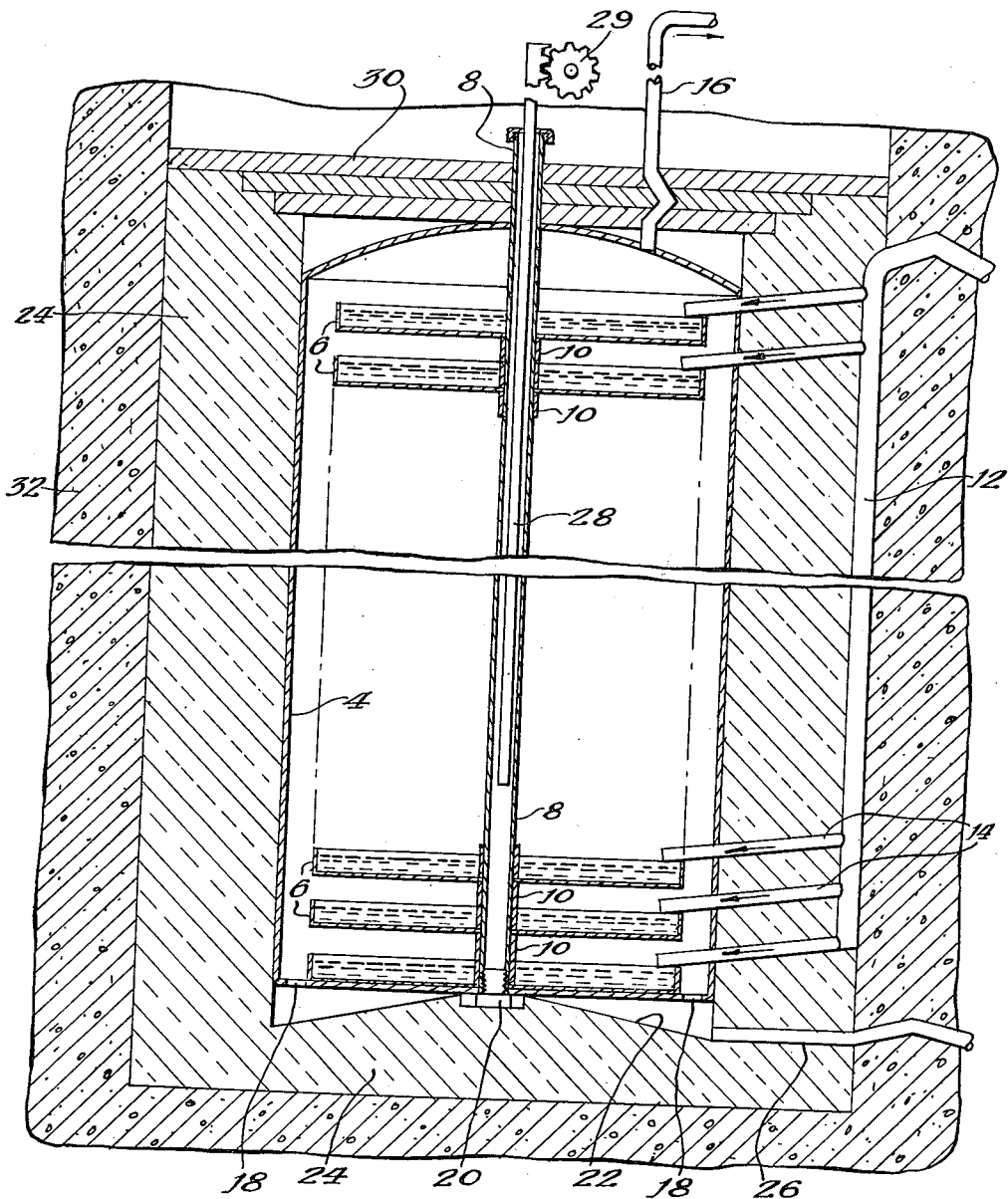
Witnesses:
Herbert E. Metcalf
Walter S. Schlegel, Jr.
Inventor:
Eugene P. Wigner
By Robert A. Cavender
Attorney.

United States Patent Office 3,070,529
Patented Dec. 25, 1962

3,070,529
NEUTRONIC REACTOR
Eugene P. Wigner, Princeton, N.J., assignor to the United States of America as represented by the United States Atomic Energy Commission
Filed Mar. 1, 1946, Ser. No. 651,282
1 Claim. (Cl. 204—193.2)

This invention relates to atomic power plants, and more particularly to a novel method and means for utilizing the heat of a nuclear fission chain reaction to produce steam for power or other purposes.

In neutronic reactors a thermal neutron fissionable isotope such as $U^{233}$, $U^{235}$, or $94^{239}$ or mixtures thereof is subject to fission by absorption of neutrons and a self-sustaining chain reaction is established by the neutrons evolved by the fission. The term "thermally fissionable" as herein used means, as is common in the art, fissionable by thermal neutrons. In general such reactors comprise bodies of compositions containing such thermally fissonable material, for example, natural uranium, disposed in a neutron slowing material which slows the neutrons to thermal energies. Such a slowing material is termed a neutron moderator. Carbon, $D_2O$ (heavy water), and ordinary water are typical moderators suitable for such use. Heat is evolved during the reaction which is removed by passage of a coolant through the reactor in heat exchange relationship therewith. Specific details of the theory and essential characteristics of such reactors are set forth in copending application of Enrico Fermi and Leo Szilard, Serial No. 568,904, filed December 19, 1944, now Patent No. 2,708,656.

In neutronic reactors, the ratio of the fast neutrons produced in one generation by the fissions to the original number of fast neutrons in a theoretical system of infinite size where there can be no external loss of neutrons is called the reproduction or multiplication factor or constant of the system, and is denoted by the symbol K. For any finite system, some neutrons will escape from the periphery of the system. Consequently, a system of finite size may be said to have a K constant, even though the value thereof would only exist if the system as built were extended to infinity without change of geometry or materials. Thus when K is referred to herein as a constant of a system of practical size, it always refers to what would exist in the same type of system of infinite size. If K can be made sufficiently greater than unity to indicate a net gain in neutrons in the theoretical system of infinite size, and then an actual system is built to be sufficiently large so that this gain is not entirely lost by leakage from the exterior surface of the system, then a self-sustaining chain reacting system of finite and practical size can be built to produce power and related by-products by nuclear fission of natural uranium. The neutron reproduction ratio in a system of finite size, therefore, differs from K by the external leakage factor, and by a factor due to the neutron absorption by localized neutron absorber, and the reproduction ratio must still be sufficiently greater than unity to permit the neutron density to rise exponentially with time in the system as built.

During the interchange of neutrons in a system of finite size, comprising bodies of any size disposed in a neutron moderator, neutrons may be lost to the chain reaction in four ways:

(1) by absorption or capture in the uranium content of the bodies without producing fission;
(2) by obsorption or capture in the moderator material;
(3) by absorption or capture by the impurities present in both the uranium bodies and the moderator; and
(4) by leakage out of the system through the periphery thereof.

It will be understood that the selection of fissionable materials and moderator materials, the relative amounts thereof and the critical size of the reactive composition required to produce a self-sustaining chain reaction, are not in themselves the subject of the present invention. Such criteria for operativeness of a neutronic reactor are by now familiar to persons skilled in the art. This invention is concerned with a novel construction which may be employed with any of the various combinations of materials which are already well known.

A general object of the invention is to design a system such as above described wherein the neutronic reactor is of novel form and comprises a fluid neutronically reactive homogeneous composition, which is hereby defined as a composition including thermally fissionable material suspended or dissolved within a liquid, preferably a liquid neutron moderator, such as heavy water or ordinary water. It has been discovered that in reactors of the above described type, the formation of steam bubbles in the fluid composition tends to change the critical size of the reactor, thereby causing periodic termination of the chain reaction as the neutron reproduction ratio of the composition is decreased by the formation of steam bubbles therein. According to the present invention, this problem has been solved by dividing the reactive composition into a plurality of spaced adjacent bodies defining a reaction zone having a neutron reproduction ratio greater than unity. By thus dividing the reactive composition, the formation of large steam bubbles is prevented, and consequently the neutron reproduction factor of the reactor remains substantially constant despite the bubbling of the reactive fluid composition in the spaced sections of the reactor.

Another object of the invention is to eliminate the hold-up time of the reactive composition outside of the reactor, by providing a plurality of spaced receptacles or trays containing the fissionable material and the associated liquid. Means is provided for replenishing the liquid in each tray as said liquid is evaporated therefrom by the heat of the chain reaction. Thus the fissionable material remains within the reaction zone and is not circulated therethrough as in reactors of the prior art.

Still another object of the invention is to design a reactor, such as above described wherein the gaseous fission products of the chain reaction are constantly swept from the reaction chamber, thereby preventing poisoning of the reaction by gases, such as $xenon^{135}$, having relatively great neutron capture cross sections.

The foregoing and other objects and advantages of the invention will become apparent from a consideration of the following specification, and the accompanying drawing, which is a diagrammatic view in central vertical cross section illustrating a neutronic reactor embodying the invention, portions of the structure being shown in elevation.

Describing the invention in detail, the novel device comprises a vessel 4 of any suitable waterproof neutron permeable material such as, for example, aluminum or stainless steel, said vessel containing a plurality of annular receptacles or containers in the form of trays 6 sleeved on a pipe or tube 8, aluminum spacers 10 being disposed between adjacent trays to maintain the same in proper spaced relationship. In the diagrammatic illustration, only a few trays are shown; however, in actual practice approximately 60 trays are utilized and are spaced about 5 centimeters apart, each tray being filled to a height of about 1½ centimeters with a fluid reactive composition. The reactive composition in the trays 6 is preferably a solution of fissionable material as, for example, uranyl fluoride, $UO_2F_2$, dissolved in a mixture $D_2O+DF$ uranyl bicarbonate, $UO_2(DCO_3)_2$, dissolved a mixture of $D_2O+Na_2CO_3+CO_2$; uranyl sulphane, $UO_2SO_4$, dissolved in a mixture of $D_2O+D_2SO_4$; uranyl nitrate, $UO_2(NO_3)_2$, dissolved in a mixture of $D_2O$; plutonium sulfate, $Pu(SO_4)_2$, dissolved in a mixture of $D_2O+D_2SO_4$; or plutonium peroxide dissolved in a mixture of $D_2O+Na_2CO_3$. In the uranium solutions, the uranium may have a natural or an enriched isotopic content of thermally fissionable $U^{235}$. The reactive composition is supplied to the trays by a header 12 having a plurality of outlets 14 communicating with respective trays.

As a result of the nuclear fission chain reaction within the reaction zone defined by the trays 6, the liquid content of the reactive composition boils, and is vaporized to form steam, which is conveyed from the vessel 4 by an outlet pipe 16 adapted to communicate with a conventional steam operated power device. If desired, the pipe 16 may be provided with any suitable filter (not shown) for eliminating radioactive fission products of the chain reaction, which products may become entrained in the steam passing from the vessel 4. As the liquid is vaporized from the trays 6, it is replenished by the header 12 through conduits 14 to maintain a substantially constant liquid level within the trays. Overflow of the reactive composition from the trays passes through perforations 18 in the bottom of the vessel 4 and is conveyed from the system as is hereinafter described.

The bottom of the tube 8 is provided with a nut 20 threaded into the tube to afford a fluid-tight closure therefor, and the head of the nut rests on the conical floor 22 of a hollow neutron reflector 24 containing the vessel 4, said reflector 24 being formed of any suitable scattering or moderating material, such as graphite or beryllium adapted to reflect neutrons escaping from the vessel 4 back into the same, thereby increasing the neutron reproduction ratio of the reactive composition therein.

One or more outlet or drain pipes 2, communicate with the interior of the reflector 24 at the base of the conical floor 22 to drain overflow composition draining from the vessel 4. In this connection, it will be understood that it is necessary from time to time to wash all the fissionable material from the trays 6 in order to renew the fissionable material and process the bombarded material to recover fission products of the reaction. If desired, the floor 22 may be provided with a suitable liner to prevent contamination of the reflector 24 by the overflow reactive composition from the trays 6.

The nuclear fission chain reaction is controlled by a rod 28 of a neutron absorbent material, such as cadmium, said rod being reciprocable within the tube 8 as by a rack and pinion mechanism 29. The top of the hollow reflector 24 is closed by a biological shield 30, preferably formed of alternate layers of iron and "Masonite" (compressed wood fiber), said shield being provided with suitable passages for the tube 8 and the steam outlet pipe 16. The reflector 24 is enclosed in a concrete vault or shield 32 adapted to absorb biologically harmful emanations from the neutronic reactor within the vessel 4 and, if desired, the top of the concrete vault may be sealed by a biological shield (not shown) similar to the before-mentioned shield 30.

Obviously the illustrated embodiment of the invention is diagrammatic, and many modifications thereof will be readily apparent to those skilled in the art without departing from the spirit of the invention or the scope of the appended claim.

What is claimed is:

A neutronic reactor comprising a plurality of horizontal trays containing, in an amount sufficient to sustain a chain reaction, a solution of a material fissionable by neutrons of thermal energy in a liquid moderator, each tray containing a portion of said solution, a vertical tube upon which the trays are sleeved in spaced relation, a neutron absorbing rod reciprocable within the tube, a gas-tight chamber enclosing said trays, an outlet pipe communicating with the top of said chamber to conduct vaporized moderator therefrom, and conduits communicating with each of said trays to replace moderator lost therefrom by evaporation.

References Cited in the file of this patent

UNITED STATES PATENTS

| | | |
|---|---|---|
| 542,626 | Cardozo | July 16, 1895 |
| 909,028 | Schalitz | Jan. 5, 1909 |
| 1,324,417 | Thunholm | Dec. 9, 1919 |
| 2,708,656 | Fermi et al. | May 17, 1955 |

FOREIGN PATENTS

| | | |
|---|---|---|
| 114,150 | Australia | May 2, 1940 |
| 114,151 | Australia | May 3, 1940 |
| 233,011 | Switzerland | June 30, 1944 |

OTHER REFERENCES

Reviews of Modern Physics, vol 17, No. 4, October 1945, pages 367, 447, 460 (part of Smyth article).

MDDC-893 U.S. Atomic Energy Commission (F. Daniels), date declassified April 7, 1947, pages 3, 5, 10, 11.

Her Majesty's Stationery Office, 1946-1951, published 1952, Harwell, The British Atomic Energy Research Establishment, London, pages 34-42.

A.E.C.D. 3063, September 4, 1944, pp. 1-14, 17, 20 (U.S. Atomic Energy Comm.).

A.E.C.D. 3065, September 19, 1945, pp. 1, 2, 7-13, 23.